(12) United States Patent
Zhang et al.

(10) Patent No.: US 11,646,050 B2
(45) Date of Patent: May 9, 2023

(54) METHOD AND APPARATUS FOR EXTRACTING VIDEO CLIP

(71) Applicant: Beijing Baidu Netcom Science and Technology Co., Ltd., Beijing (CN)

(72) Inventors: Qinyi Zhang, Beijing (CN); Caihong Ma, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 111 days.

(21) Appl. No.: 17/212,037

(22) Filed: Mar. 25, 2021

(65) Prior Publication Data

US 2021/0209371 A1     Jul. 8, 2021

(30) Foreign Application Priority Data

Sep. 30, 2020   (CN) .......................... 202011064001.4

(51) Int. Cl.
*H04N 9/80* (2006.01)
*G10L 25/54* (2013.01)
(Continued)

(52) U.S. Cl.
CPC .......... *G10L 25/54* (2013.01); *G06F 16/7834* (2019.01); *G06F 18/2413* (2023.01);
(Continued)

(58) Field of Classification Search
CPC .. G06F 16/7834; G06V 10/82; G06V 10/454; G06V 20/49; G06V 20/46; G06V 20/41;
(Continued)

(56) References Cited

U.S. PATENT DOCUMENTS

| 2004/0200337 | A1  | 10/2004 | Abe et al. |
|---|---|---|---|
| 2016/0247328 | A1  | 8/2016 | Han et al. |
| 2021/0271891 | A1* | 9/2021 | Bao .................. H04N 21/44008 |

FOREIGN PATENT DOCUMENTS

| CN | 108989882 A | 12/2018 |
|---|---|---|
| CN | 110324657 A | 10/2019 |

(Continued)

OTHER PUBLICATIONS

Liu et al., "Audio Feature Extraction and Analysis for Scene Segmentation and Classification", Journal of VLSI Signal Processing, 1998, pp. 61-78, vol. 20.

*Primary Examiner* — Mishawn N. Hunter
(74) *Attorney, Agent, or Firm* — The Webb Law Firm

(57) ABSTRACT

The present disclosure discloses a method and apparatus for extracting a video clip, relates to the field of artificial intelligence technology such as video processing, audio processing, and cloud computing. The method includes: acquiring a video, and extracting an audio stream in the video; determining a confidence that audio data in each preset period in the audio stream comprises a preset feature; and extracting a target video clip corresponding to a location of a target audio clip in the video; wherein the target audio clip is an audio clip within a continuous preset period, and has a confidence that the audio data includes the preset feature, which is larger than a preset confidence threshold. This method may improve the accuracy of extracting a video clip.

15 Claims, 4 Drawing Sheets

(51) Int. Cl.
*G06F 16/783* (2019.01)
*G06N 3/04* (2023.01)
*G06V 20/40* (2022.01)
*G06F 18/2413* (2023.01)
*G06V 10/82* (2022.01)
*G06V 10/44* (2022.01)

(52) U.S. Cl.
CPC ............. *G06N 3/04* (2013.01); *G06V 10/454* (2022.01); *G06V 10/82* (2022.01); *G06V 20/41* (2022.01); *G06V 20/46* (2022.01); *G06V 20/49* (2022.01)

(58) Field of Classification Search
CPC ......... G06K 9/627; G10L 25/54; G10L 25/57; G10L 25/30; G10L 25/18; G06N 3/04
USPC .................... 386/241, 248, 278, 285, 321
See application file for complete search history.

(56) References Cited

FOREIGN PATENT DOCUMENTS

| | | | |
|---|---|---|---|
| JP | 2003173199 A | | 6/2003 |
| JP | 2004191780 A | | 7/2004 |
| JP | 2004309920 A | | 11/2004 |
| JP | 110263220 A | * | 9/2019 |
| KR | 1020070050271 A | | 5/2007 |
| KR | 100803747 B1 | | 2/2008 |
| KR | 1020200092502 A | | 8/2020 |

* cited by examiner

METHOD AND APPARATUS FOR EXTRACTING VIDEO CLIP

CROSS-REFERENCE TO RELATED APPLICATION

This application claims priority to Chinese Patent Application No. 202011064001.4 filed Sep. 30, 2020, the disclosure of which is hereby incorporated by reference in its entirety.

BACKGROUND OF THE INVENTION

Field of the Invention

The present disclosure relates to the field of computer technology, in particular to the field of artificial intelligence technology such as video processing, audio processing, and cloud computing, and more particular to a method and apparatus for extracting a video clip.

Description of Related Art

With the development of network technology, more and more video resources are stored in the network. Extracting a particular video clip in a video may help a user to acquire particular information. The conventional method for extracting a particular video clip in a video comprises: extracting the particular video clip in the video based on an audio feature of an audio stream in the video.

However, the method for extracting the particular video clip in the video based on the audio feature of the audio stream in the video has the problem of inaccurate extraction results.

SUMMARY OF THE INVENTION

A method, apparatus, and electronic device for extracting a video clip, and a computer readable storage medium are provided.

In a first aspect, embodiments of the present disclosure provide a method for extracting a video clip, comprising: acquiring a video, and extracting an audio stream in the video; determining a confidence that audio data in each preset period in the audio stream comprises a preset feature; and extracting a target video clip corresponding to a location of a target audio clip in the video; wherein the target audio clip is an audio clip within a continuous preset period, and has a confidence that the audio data comprises the preset feature, which is larger than a preset confidence threshold.

In a second aspect, embodiments of the present disclosure provide an apparatus for extracting a video clip, comprising: an acquisition unit, configured to acquire a video, and extract an audio stream in the video; a determination unit, configured to determine a confidence that audio data in each preset period in the audio stream comprises a preset feature; and an extraction unit, configured to extract a target video clip corresponding to a location of a target audio clip in the video; wherein the target audio clip is an audio clip within a continuous preset period, and has a confidence that the audio data comprises the preset feature, which is larger than a preset confidence threshold.

In a third aspect, embodiments of the present disclosure provide an electronic device, comprising: one or more processors; and a memory, storing one or more programs, wherein the one or more programs, when executed by the one or more processors, cause the one or more processors to implement the method for extracting a video clip provided by the first aspect.

In a fourth aspect, embodiments of the present disclosure provide a computer-readable medium, storing a computer program thereon, wherein the program, when executed by a processor, causes the processor to implement the method for extracting a video clip provided by the first aspect.

The method and apparatus for extracting a video clip provided by the present disclosure acquire a video, and extract an audio stream in the video; determine a confidence that audio data in each preset period in the audio stream comprises a preset feature; and extract a target video clip corresponding to a location of a target audio clip in the video. The method and apparatus may improve the accuracy of extracting a video clip.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure, in which.

DESCRIPTION OF THE INVENTION

The following describes exemplary embodiments of the present disclosure with reference to the accompanying drawings, which comprise various details of the embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
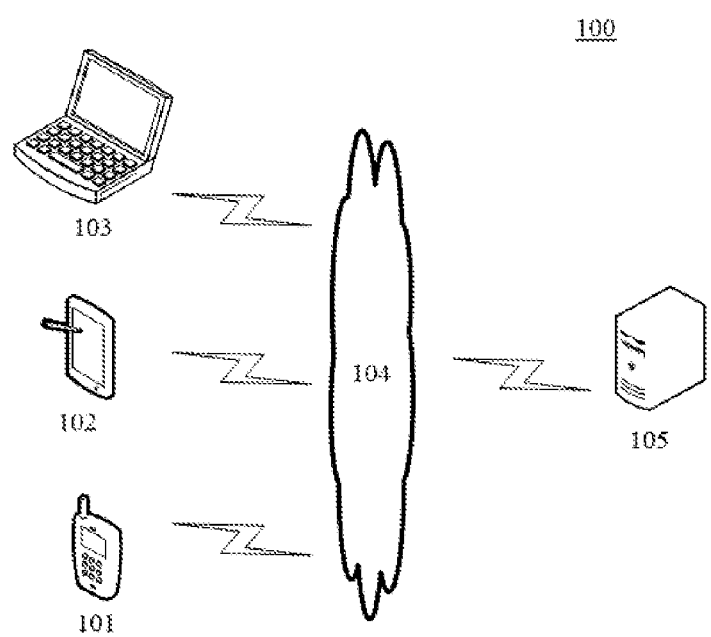
FIG. 1 is an exemplary system architecture diagram in which an embodiment of the present disclosure may be implemented.

FIG. 1 illustrates an exemplary system architecture 100 of an embodiment of a method for extracting a video clip or an apparatus for extracting a video clip in which the present disclosure may be implemented.

As shown in FIG. 1, the system architecture 100 may comprise terminal devices 101, 102, and 103, a network 104, and a server 105. The network 104 is used to provide a communication link medium between the terminal devices 101, 102, 103 and the server 105. The network 104 may comprise various types of connections, such as wired, wireless communication links, or optic fibers.

A user may interact with the server 105 through the network 104 using the terminal devices 101, 102, and 103, to receive or send messages and the like. Various client applications may be installed on the terminal devices 101, 102, and 103, such as video applications, playback applications, audio applications, search applications, shopping applications, and financial applications.

The terminal devices 101, 102, and 103 may be various electronic devices having display screens and supporting receiving server messages, comprising but not limited to smart phones, tablet computers, E-book readers, MP3 players (Moving Picture Experts Group Audio Layer III), MP4 (Moving Picture Experts Group Audio Layer IV) players, laptop portable computers and desktop computers, etc.

The terminal devices 101, 102, and 103 may be hardware or software. When the terminal devices 101, 102, and 103 are hardware, they may be various electronic devices. When the terminal devices 101, 102, and 103 are software, they may be installed in the electronic devices listed above, or may be implemented as a plurality of software or software modules (for example, a plurality of software modules for providing distributed services), or as a single software or software module, which is not particularly limited herein.

The server 105 may acquire a video using the terminal devices 101, 102, and 103, extract an audio stream in the video, and determine a confidence that audio data in each preset period in the audio stream comprises a preset feature, and then extract a video clip of consecutive video clips corresponding to an audio clip having the confidence that the audio data comprises the preset feature above a preset confidence threshold, and within a continuous preset period in the video.

It should be noted that the method for extracting a video clip provided by the embodiments of the present disclosure is generally performed by the server 105. Correspondingly, the apparatus for extracting a video clip is generally provided in the server 105.

It should be understood that the number of terminal devices, networks, and servers in FIG. 1 is merely illustrative. Depending on the implementation needs, there may be any number of terminal devices, networks, and servers.

Figure 2:
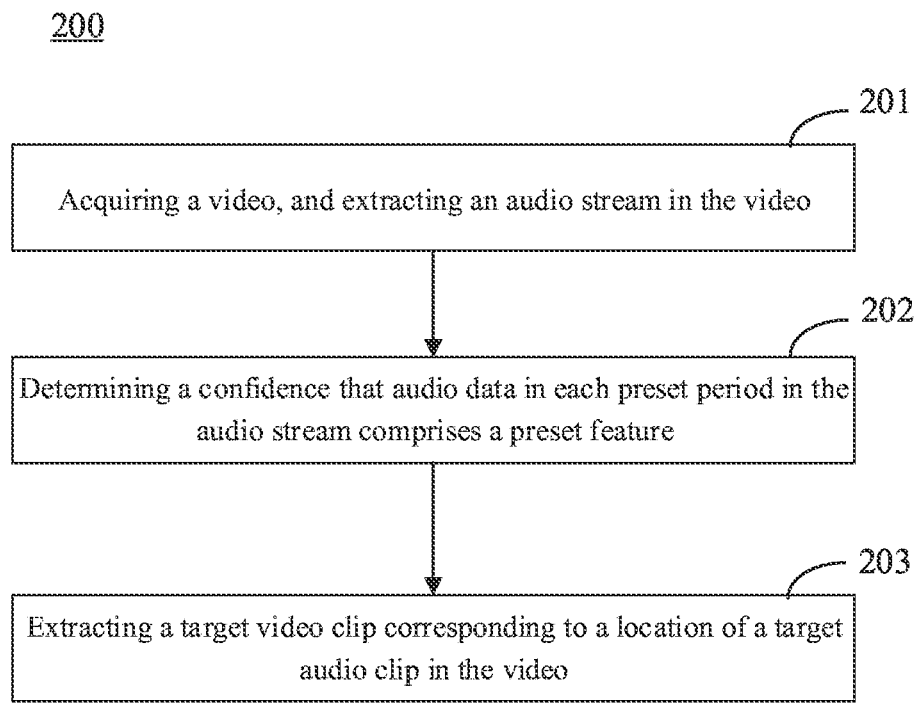
FIG. 2 is a flowchart of an embodiment of a method for extracting a video clip according to the present disclosure.

With further reference to FIG. 2, illustrating a flow 200 of an embodiment of a method for extracting a video clip according to the present disclosure. The method for extracting a video clip comprises the following steps:

Step 201, acquiring a video, and extracting an audio stream in the video.

In the present embodiment, an executing body of the method for extracting a video clip (for example, the server as shown in FIG. 1) may acquire the video through the Internet, a local storage, or other methods that may acquire the video using a wired or wireless connection, and extract the audio stream in the video using an audio extraction method such as audio-video conversion or audio analysis.

Step 202, determining a confidence that audio data in each preset period in the audio stream comprises a preset feature.

In the present embodiment, the method for determining a confidence that audio data in each preset period in the extracted audio stream comprises a preset feature may be: recognizing the audio data of each preset period in the audio stream using a pre-trained audio feature recognition model, and outputting the confidence that the audio data of each preset period comprises the preset feature. In addition, it is also possible to determine the confidence that the audio data comprises the preset feature by performing feature traversal and comparison on an audio spectrum of the audio data of each period in the audio stream.

In the present embodiment, each preset period is a time node or time period preset by a user for collecting the preset feature in the audio stream. For example, the preset feature may be collected for audio data per second in the audio stream, the preset feature may be collected for audio data of the middle 10 minutes in the audio stream based on playback time of the audio stream, or the audio stream may be divided into a plurality of audio stream chips in advance, and then the preset feature is collected for audio data of each of the audio stream clips.

In the present embodiment, the preset feature is determined based on a requirement for extracting a video clip, and the preset feature corresponds to the requirement for extracting a video clip and content related to the video. For example, if the video involves the content of sports events, and the requirement for extracting a video clip is to extract climax clips such as moments of wonderful goals in the video clip, audience cheering clips, or exciting narrating by a narrator, then the preset feature may be the feature that an audio frequency of the audio data changes instantaneously (a difference between the maximum and minimum audio frequencies in a certain piece of audio data exceeds a preset threshold). As another example, if the video involves the content of a concert and the requirement for extracting a video clip is to extract the climax part of the concert in the video clip, then the preset feature may be the feature that an audio frequency of the audio data is higher than a preset sound frequency. As another example, if the video is an event recording video such as a news report or a meeting record, and the requirement for extracting a video clip is to extract a speech clip of a designated person in the video clip, then the preset feature may be a voice frequency feature of the designated person. It may be understood that the preset feature is an audio feature corresponding to the content involved in the video clip and the requirement for extracting a video clip.

Step 203, extracting a target video clip corresponding to a location of a target audio clip in the video; wherein the target audio clip is an audio clip within a continuous preset period, and has a confidence that the audio data comprises the preset feature, which is larger than a preset confidence threshold.

In the present embodiment, the audio clip having the confidence that the audio data comprises the preset feature above the preset confidence threshold, and within the continuous preset period is set as the target audio clip. The video clip corresponding to the location of the target audio clip in the video is extracted.

Particularly, when the audio data of the preset period are audio data clips obtained by dividing the audio stream according to a certain time interval, an audio clip composed of audio data having the confidence that the audio data comprises the preset feature above the preset confidence threshold, and within the continuous preset period may be set as the target audio clip.

Particularly, when the audio data of the preset period are audio data on a time node per second (or any time interval point) in the audio stream, an audio clip in a time range formed by continuous time nodes having the confidence that the audio data comprises the preset feature above the preset confidence threshold may be set as the target audio clip.

Particularly, when the audio data of the preset period are audio data of a specified time position and a specified time length in the audio stream, if the audio data of the specified time position and the specified time length have the confidence that the audio data comprises the preset feature above the preset confidence threshold, the audio data of the specified time position and the specified time length are set as the target audio clip.

The method for extracting a video clip provided by the present embodiment acquires a video, and extracts an audio stream in the video; determines a confidence that audio data in each preset period in the audio stream comprises a preset feature; and extracts a target video clip corresponding to a location of a target audio clip in the video. The method may improve the accuracy of extracting a video clip.

Alternatively, the preset confidence threshold is plurality of preset confidence thresholds, and the extracting a target video clip corresponding to a location of a target audio clip in the video, comprises: determining the audio clip within a continuous preset period, the confidence of which is above the preset confidence threshold, for each preset confidence threshold of the plurality of preset confidence thresholds; determining the target audio clip in a plurality of audio clips determined based on the plurality of preset confidence thresholds; and extracting the target video clip corresponding to the location of the target audio clip in the video.

In the present embodiment, a plurality of different preset confidence thresholds may be preset first, then for each preset confidence threshold of the plurality of preset confidence thresholds, an initial selection is performed and the audio clip having the confidence that the audio data comprises the preset feature above the preset confidence threshold, and within the continuous preset period is determined.

A plurality of audio clips may be determined based on a plurality of different preset confidence thresholds, a confidence threshold may be further preset, and then a plurality of audio clips determined in the initial selection phase are further selected based on the confidence threshold, to select the target audio clip, where the confidence threshold may be higher than each preset confidence threshold in the plurality of different preset confidence thresholds; or, after the plurality of audio clips are determined based on the plurality of different preset confidence thresholds, the target audio clip is determined based on feature attributes of the audio clips, such as playback time of the plurality of audio clips, and spectrum ranges of the audio data corresponding to the audio clips.

Then, extracting a target video clip corresponding to a location of the target audio clip in the video.

In the present embodiment, using a plurality of preset confidence thresholds to select the audio clips may obtain audio clips having different levels of confidence that the audio data comprise the preset feature, which helps to select a local maxima, thereby helping select a plurality of audio clips that meet the selecting condition, and perform second-phase or multi-phase selection in the plurality of audio clips that meet the selection condition. In addition, the plurality of audio clips determined based on the plurality of preset confidence thresholds are further selected based on the confidence threshold, which may improve the accuracy of determining the target audio clip.

Figure 3:
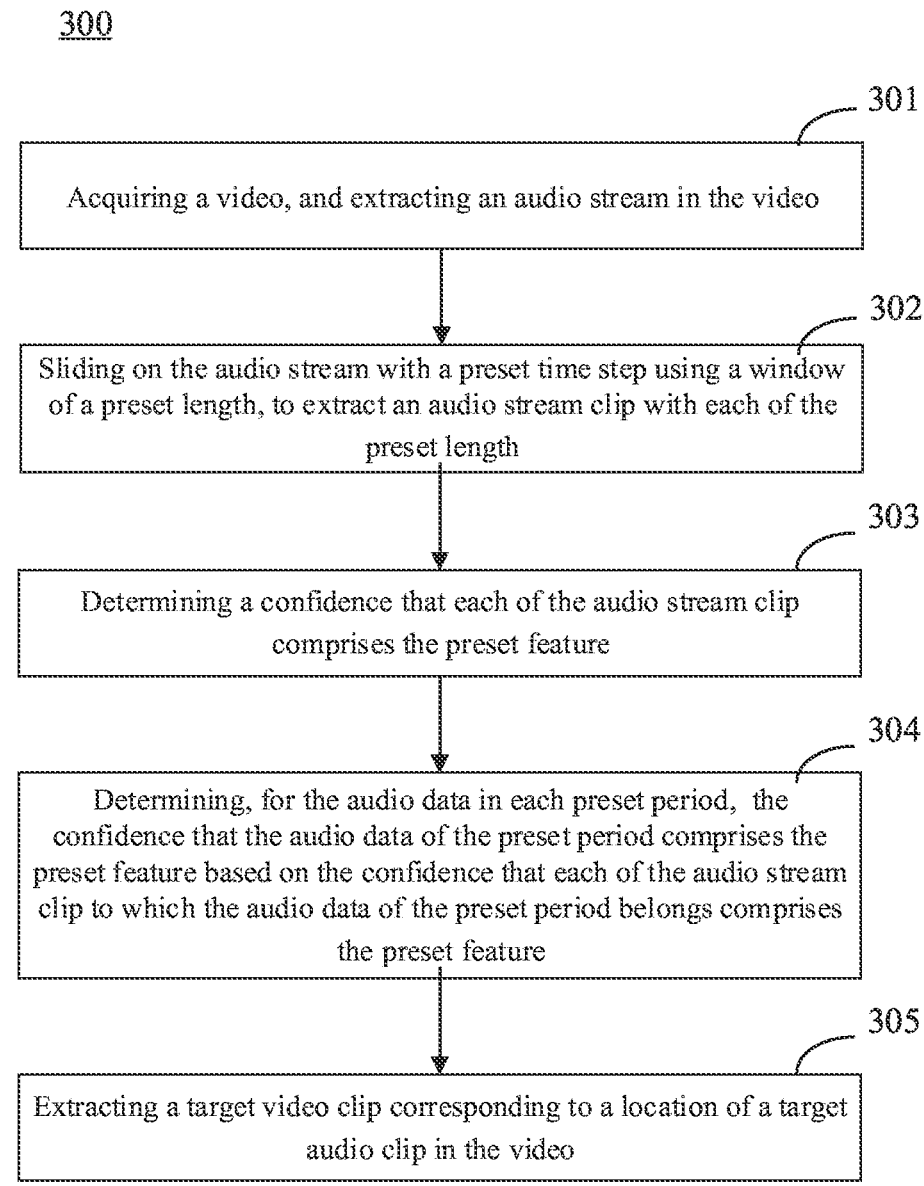
FIG. 3 is a flowchart of another embodiment of the method for extracting a video clip according to the present disclosure.

With further reference to FIG. 3, illustrating a flow 300 of another embodiment of the method for extracting a video clip. The flow 300 of the method for extracting a video clip comprises the following steps:

Step 301, acquiring a video, and extracting an audio stream in the video.

Step 302, sliding on the audio stream with a preset time step using a window of a preset length, to extract an audio stream clip with each of the preset length.

In the present embodiment, the window of the preset length may be used to slide on the audio stream with the preset time step, to intercept the audio stream clip with each of the preset length. It may be understood that when the preset step is less than the preset length, there is overlapping audio data between the intercepted audio stream clips.

Step 303, determining a confidence that each of the audio stream clip comprises the preset feature.

In the present embodiment, a pre-trained audio feature recognition model may be used to recognize each intercepted audio stream clip, and output the confidence that each of the audio stream clip comprises the preset feature.

Step 304, determining, for the audio data in each preset period, the confidence that the audio data of the preset period comprises the preset feature based on the confidence that each of the audio stream clip to which the audio data of the preset period belongs comprises the preset feature.

In the present embodiment, the audio data of each preset period may be one or more audio stream clips intercepted by using the window of the preset length, and the confidence that the audio data of the preset time clip comprises the preset feature may be determined based on the confidence that each of the audio stream clip to which the audio data of the preset period belongs comprises the preset feature. For example, the confidence that the audio data of the preset period comprises the preset feature may be: an average value, a maximum value, or a median value of the confidence that the audio stream clip of each of the audio stream clip to which the audio data of the preset period belongs comprises the preset feature, and so on. It should be noted that when all audio data of the preset period may not be intercepted by an interception window at the same time, the audio data of the preset period may be attributed into any audio stream clip corresponding to part of the audio data intercepted of the preset period. It may be understood that determining the confidence that the audio data of each preset period comprises the preset feature, based on the confidence that each of the audio stream clip to which the audio data of the preset period belongs comprises the preset feature, may make a segmentation of a start and end points of the audio clip of the audio data comprising the preset feature more accurate.

Step 305, extracting a target video clip corresponding to a location of a target audio clip in the video; wherein the target audio clip is an audio clip within a continuous preset period, and has a confidence that the audio data comprises the preset feature, which is larger than a preset confidence threshold.

The description of step 301 and step 305 in the present embodiment is consistent with the description of step 201 and step 203, and detailed description thereof will be omitted.

The method for extracting a video clip provided in the present embodiment, uses a preset time window to divide the audio stream in the video into audio stream clips comprising overlapping audio data, determines the confidence that the audio stream clip comprises the preset feature, determines the confidence that the audio data of the preset period comprises the preset feature, based on the confidence that each of the audio stream clip to which the audio data of the preset period belongs comprises the preset feature, and extracts the target audio clip based on the confidence that the audio data of the preset period comprises the preset feature, and extracts the target video clip based on the target audio clip, which may improve the accuracy of extracting the target video clip.

In some alternative implementations of the embodiment described above in conjunction with FIG. 2 and FIG. 3, the determining a confidence that audio data in each preset period in the audio stream comprises a preset feature, comprises: using a neural network classification model to determine the confidence that the audio data of each preset period in the audio stream comprises the preset feature.

In the present embodiment, a pre-trained neural network classification model for identifying the preset feature in the audio data may be used to determine the confidence that the audio data of each preset period in the audio stream comprises the preset feature. It may be understood that training samples of the pre-trained neural network classification model for identifying the preset feature in the audio data comprise training audio data, and a confidence/probability that the training audio data comprises the preset feature (or a similarity between an audio feature of the training audio data and the preset feature, etc.). In the present embodiment, the neural network classification model is used to determine the confidence that the audio data comprises the audio feature, which may improve the accuracy of confidence determination.

In some alternative implementations of the embodiment described above in conjunction with FIG. 2 and FIG. 3, the preset feature comprises a feature representing that a spectrum change of the audio data in the audio stream exceeds a preset spectrum change threshold.

In the present embodiment, the preset feature comprises the feature representing that the spectrum change of the audio data in the audio exceeds the preset spectrum change threshold. That is, the preset feature comprises a feature representing that the audio data in the audio changes instantaneously (audio frequency changes from small to large, or from large to small within a certain period, and the change exceeds the preset spectrum change threshold). Feature extraction of the instantaneous change of the audio data may be based on a voice feature MFCC (Mel Frequency Cepstrum Coefficient) feature extraction method and the like.

Figure 4:
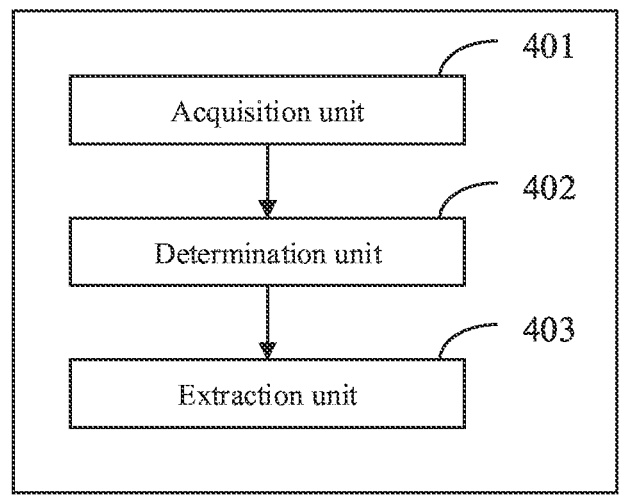
FIG. 4 is a schematic structural diagram of an embodiment of an apparatus for extracting a video clip according to the present disclosure.

With further reference to FIG. 4, as an implementation of the method shown in the above figures, the present disclosure provides an embodiment of an apparatus for extracting a video clip, and the apparatus embodiment corresponds to the method embodiment as shown in FIG. 2. The apparatus may be particularly applied to various electronic devices.

As shown in FIG. 4, an apparatus 400 for extracting a video clip of the present embodiment comprises: an acquisition unit 401, a determination unit 402 and an extraction unit 403. The acquisition unit 401 is configured to acquire a video, and extract an audio stream in the video. The determination unit 402 is configured to determine a confidence that audio data in each preset period in the audio stream comprises a preset feature. The extraction unit 403 is configured to extract a target video clip corresponding to a location of a target audio clip in the video; wherein the target audio clip is an audio clip within a continuous preset period, and has a confidence that the audio data comprises the preset feature, which is larger than a preset confidence threshold.

In some embodiments, the determination unit comprises: an interception module, configured to slide on the audio stream with a preset time step using a window of a preset length, to extract an audio stream clip with each of the preset length; a first determination module, configured to determine a confidence that each of the audio stream clip comprises the preset feature; and a second determination module, configured to determine, for the audio data in each preset period, the confidence that the audio data of the preset period comprises the preset feature based on the confidence that each of the audio stream clip to which the audio data of the preset period belongs comprises the preset feature.

In some embodiments, the preset confidence threshold is plurality of preset confidence thresholds, and the extraction unit comprises: a third determination module, configured to determine the audio clip within a continuous preset period, the confidence of which is above the preset confidence threshold, for each preset confidence threshold of the plurality of preset confidence thresholds; a fourth determination module, configured to determine the target audio clip in a plurality of audio clips determined based on the plurality of preset confidence thresholds; and an extraction module, configured to extract the target video clip corresponding to the location of the target audio clip in the video.

In some embodiments, the determination unit comprises: a neural network module, configured to use a neural network classification model to determine the confidence that the audio data of each preset period in the audio stream comprises the preset feature.

In some embodiments, the preset feature comprises a feature representing that a spectrum change of the audio data in the audio stream exceeds a preset spectrum change threshold.

The units in the apparatus 400 correspond to the steps in the method described with reference to FIG. 2. Therefore, the operations, features, and achievable technical effects described above for the method for extracting a video clip are also applicable to the apparatus 400 and the units comprised therein, and detailed description thereof will be omitted.

According to an embodiment of the present disclosure, the present disclosure further provides an electronic device and a readable storage medium.

Figure 5:
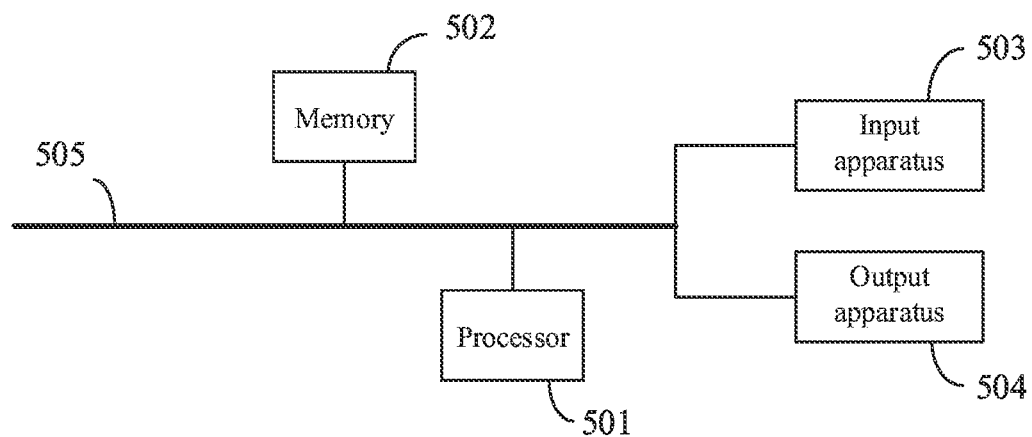
FIG. 5 is a block diagram of an electronic device used to implement the method for extracting a video clip according to an embodiment of the present disclosure.

As shown in FIG. 5, which is a block diagram of an electronic device of a method for extracting a video clip according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device comprises: one or more processors 501, a memory 502, and interfaces for connecting various components, comprising high-speed interfaces and low-speed interfaces. The various components are connected to each other using different buses, and may be installed on a common motherboard or in other methods as needed. The processor may process instructions executed within the electronic device, comprising instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 5, one processor 501 is used as an example.

The memory 502 is a non-transitory computer readable storage medium provided by the present disclosure. The memory stores instructions executable by at least one processor, so that the at least one processor performs the method for extracting a video clip provided by the present disclosure. The non-transitory computer readable storage medium of the present disclosure stores computer instructions for causing a computer to perform the method for extracting a video clip provided by the present disclosure.

The memory 502, as a non-transitory computer readable storage medium, may be used to store non-transitory software programs, non-transitory computer executable programs and modules, such as program instructions/modules corresponding to the method for extracting a video clip in the embodiments of the present disclosure (for example, the acquisition unit 401, the determination unit 402, and the extraction unit 403 shown in FIG. 4). The processor 501 executes the non-transitory software programs, instructions, and modules stored in the memory 502 to execute various functional applications and data processing of the server, that is, to implement the method for extracting a video clip in the foregoing method embodiment.

The memory 502 may comprise a storage program area and a storage data area, where the storage program area may store an operating system and at least one function required application program; and the storage data area may store data created by the use of the electronic device according to the method for processing parking, etc. In addition, the memory 502 may comprise a high-speed random access memory, and may also comprise a non-transitory memory, such as at least one magnetic disk storage device, a flash memory device, or other non-transitory solid-state storage devices. In some embodiments, the memory 502 may optionally comprise memories remotely provided with respect to the processor 501, and these remote memories may be connected to the electronic device of the method for extracting a video clip through a network. Examples of the above network comprise but are not limited to the Internet, intranet, local area network, mobile communication network, and combinations thereof.

The electronic device of the method for extracting a video clip may further comprise: an input apparatus 503, an output apparatus 504, and a bus 505. The processor 501, the memory 502, the input apparatus 503, and the output apparatus 504 may be connected through the bus 505 or in other methods. In FIG. 5, connection through a bus is used as an example.

The input apparatus 503 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 504 may comprise a display device, an auxiliary lighting apparatus (for example, LED), a tactile feedback apparatus (for example, a vibration motor), and the like. The display device may comprise, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application particular integrated circuits), computer hardware, firmware, software, and/or combinations thereof. These various embodiments may comprise: being implemented in one or more computer programs that may be executed and/or interpreted on a programmable system that comprises at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) comprise machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, comprising machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (comprising acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), and the Internet.

The computer system may comprise a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure may be achieved, no limitation is made herein.

The above particular embodiments do not constitute limitation on the protection scope of the present disclosure.

Those skilled in the art should understand that various modifications, combinations, sub-combinations and substitutions may be made according to design requirements and other factors. Any modification, equivalent replacement and improvement made within the spirit and principle of the present disclosure shall be comprised in the protection scope of the present disclosure.

What is claimed is:

1. A method for extracting a video clip, the method comprising:

acquiring a video, and extracting an audio stream in the video;

determining a confidence that audio data in each preset period in the audio stream comprises a preset feature; and extracting a target video clip corresponding to a location of a target audio clip in the video; wherein the target audio clip is an audio clip within a continuous preset period, and has a confidence that the audio data comprises the preset feature, which is larger than a preset confidence threshold.

2. The method according to claim 1, wherein the determining comprises:

sliding on the audio stream with a preset time step using a window of a preset length, to extract an audio stream clip with each of the preset length;

determining a confidence that each of the audio stream clip comprises the preset feature; and determining, for the audio data in each preset period, the confidence that the audio data of the preset period comprises the preset feature based on the confidence that each of the audio stream clip to which the audio data of the preset period belongs comprises the preset feature.

3. The method according to claim 1, wherein the preset confidence threshold is a plurality of preset confidence thresholds, and the extracting the target video clip comprises:

determining the audio clip within a continuous preset period, the confidence of which is above the preset confidence threshold, for each preset confidence threshold of the preset confidence thresholds;

determining the target audio clip in a plurality of audio clips determined based on the preset confidence thresholds; and extracting the target video clip corresponding to the location of the target audio clip in the video.

4. The method according to claim 1, wherein the determining the confidence comprises:

using a neural network classification model to determine the confidence that the audio data of each preset period in the audio stream comprises the preset feature.

5. The method according to claim 1, wherein the preset feature comprises a feature representing that a spectrum change of the audio data in the audio stream exceeds a preset spectrum change threshold.

6. An electronic device, comprising:
at least one processor; and
a memory, communicatively connected to the at least one processor; wherein,
the memory, storing instructions executable by the at least one processor, the instructions, when executed by the at least one processor, cause the at least one processor to perform an operation for extracting a video clip, comprising:

acquiring a video, and extracting an audio stream in the video;

determining a confidence that audio data in each preset period in the audio stream comprises a preset feature; and extracting a target video clip corresponding to a location of a target audio clip in the video; wherein the target audio clip is an audio clip within a continuous preset period, and has a confidence that the audio data comprises the preset feature, which is larger than a preset confidence threshold.

7. The device according to claim 6, wherein the determining comprises:

sliding on the audio stream with a preset time step using a window of a preset length, to extract an audio stream clip with each of the preset length;

determining a confidence that each of the audio stream clip comprises the preset feature; and determining, for the audio data in each preset period, the confidence that the audio data of the preset period comprises the preset feature based on the confidence that each of the audio stream clip to which the audio data of the preset period belongs comprises the preset feature.

8. The device according to claim 6, wherein the preset confidence threshold is a plurality of preset confidence thresholds, and the extracting the target video clip comprises:

determining the audio clip within a continuous preset period, the confidence of which is above the preset confidence threshold, for each preset confidence threshold of the preset confidence thresholds;

determining the target audio clip in a plurality of audio clips determined based on the preset confidence thresholds; and extracting the target video clip corresponding to the location of the target audio clip in the video.

9. The device according to claim 6, wherein the determining the confidence comprises:

using a neural network classification model to determine the confidence that the audio data of each preset period in the audio stream comprises the preset feature.

10. The device according to claim 6, wherein the preset feature comprises a feature representing that a spectrum change of the audio data in the audio stream exceeds a preset spectrum change threshold.

11. A non-transitory computer readable storage medium, storing computer instructions, the computer instructions, being used to cause the computer to perform an operation for extracting a video clip, comprising:

acquiring a video, and extracting an audio stream in the video;

determining a confidence that audio data in each preset period in the audio stream comprises a preset feature; and extracting a target video clip corresponding to a location of a target audio clip in the video; wherein the target audio clip is an audio clip within a continuous preset period, and has a confidence that the audio data comprises the preset feature, which is larger than a preset confidence threshold.

12. The medium according to claim 11, wherein the determining comprises:

sliding on the audio stream with a preset time step using a window of a preset length, to extract an audio stream clip with each of the preset length;

determining a confidence that each of the audio stream clip comprises the preset feature; and determining, for the audio data in each preset period, the confidence that the audio data of the preset period comprises the preset feature based on the confidence that each of the audio stream clip to which the audio data of the preset period belongs comprises the preset feature.

13. The medium according to claim 11, wherein the preset confidence threshold is a plurality of preset confidence thresholds, and the extracting the target video clip comprises:
   determining the audio clip within a continuous preset period, the confidence of which is above the preset confidence threshold, for each preset confidence threshold of the preset confidence thresholds;
   determining the target audio clip in a plurality of audio clips determined based on the preset confidence thresholds; and
   extracting the target video clip corresponding to the location of the target audio clip in the video.

14. The medium according to claim 11, wherein the determining the confidence comprises:
   using a neural network classification model to determine the confidence that the audio data of each preset period in the audio stream comprises the preset feature.

15. The medium according to claim 11, wherein the preset feature comprises a feature representing that a spectrum change of the audio data in the audio stream exceeds a preset spectrum change threshold.

* * * * *